Figure 1:
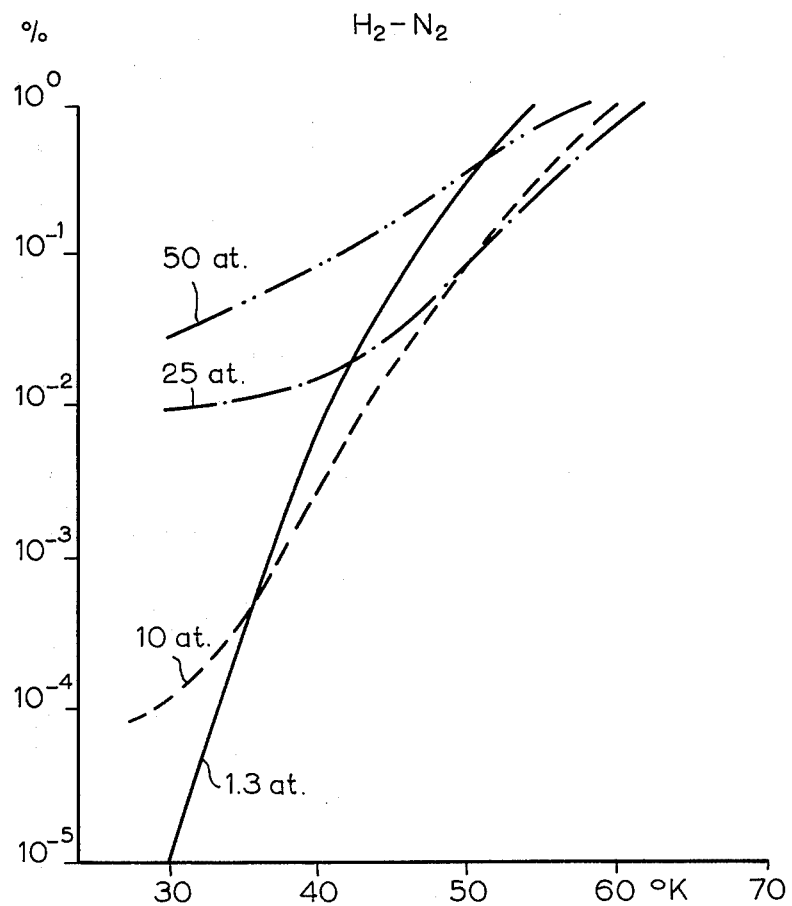

2,975,605
PROCESS FOR PURIFYING TECHNICAL HYDROGEN

Pieter J. Haringhuizen, Geleen, Netherlands, assignor to Stamicarbon N.V., Heerlen, Netherlands Filed Sept. 27, 1955, Ser. No. 537,071

4 Claims. (Cl. 62—13)

The present invention relates to a process for the purification of hydrogen, in which residual amounts of other gases present in the hydrogen, such as nitrogen, carbon monoxide or argon are deposited in the solid form in a refrigeration process.

An important application of the invention is in the isolation of deuterium from hydrogen by distillation.

Natural hydrogen contains about 0.015% of deuterium so that the isolation of such deuterium on an industrial scale is economically justified only if the hydrogen which is distilled off can immediately be used for other purposes, e.g., for the manufacture of ammonia.

Consequently only technical hydrogen can be used as starting material, e.g., hydrogen obtained in the water gas reaction. This hydrogen is always contaminated with rather large amounts of nitrogen, carbon monoxide, argon and other gases.

The greater part of these contaminations can be separated off in the liquid form by cooling the hydrogen to below the condensation temperature of the impurities, so that these are deposited in the liquid form. Care should be taken that cooling to below the solidification point of these impurities is not effected in one step, as in such case blocking might easily occur.

After removal of the condensed gases, hydrogen is left which at the condensation temperature is still permeated with small amounts of the various impurities.

It is, naturally, possible to carry out the further purification by means of adsorption filters. However, it has been found by calculations that, if rearrangements are to be effected at reasonable intervals, these filters would become very large. At the condensation temperature of nitrogen the hydrogen still contains 2–3% of nitrogen, depending on the pressure. If now, e.g., 25,000 m.$^3$ (NTP) of hydrogen per hour are used for the isolation of deuterium, such a filter would require to absorb 500–700 m.$^3$ (NTP) of nitrogen per hour. The difficulties in cleaning such large filters makes them uneconomical and moreover their resistance is rather high.

As an alternative, by continuing the cooling process after removal of the condensed gases, the residual impurities can be deposited in the solid form and it has been proposed to remove the residual impurities in this way using heat regenerators or reversing heat exchangers (cf. Chem. Eng. Progr. 50, pp. 221–229, especially pp. 227 and 228). According to this proposal the hydrogen to be cooled and purified is passed through a heat regenerator or a reversing heat exchanger for a given time, analogous to what is done in the removal of $H_2O$ and $CO_2$ in air separation, so that the hydrogen is cooled and the undesired substances are deposited as solids by condensation. After a certain period a rearrangement is effected, so that then the heat exchanger is traversed in the opposite direction by a flushing current of cold hydrogen, obtained from the distillation, in which the gases that were deposited evaporate again.

Notwithstanding the fact that in this process the temperature at any point in the regenerator or heat exchanger during its traversal by the flushing hydrogen is lower than the temperature at that point during deposition of the impurities, involving a maximum vapour pressure of the impurities in the flushing hydrogen current lower than in the gas current to be purified, evaporation will, according to the aforementioned proposal, nevertheless take place because the hydrogen to be purified which originally enters the exchanger has a certain preliminary pressure, say 17 atmospheres, whereas the flushing hydrogen is in the expanded state. Therefore the flushing hyrogen occupies a much greater volume, and, according to the aforesaid proposal, the maximum amount of vapour which can be taken up should therefore be much larger.

Figure 2:
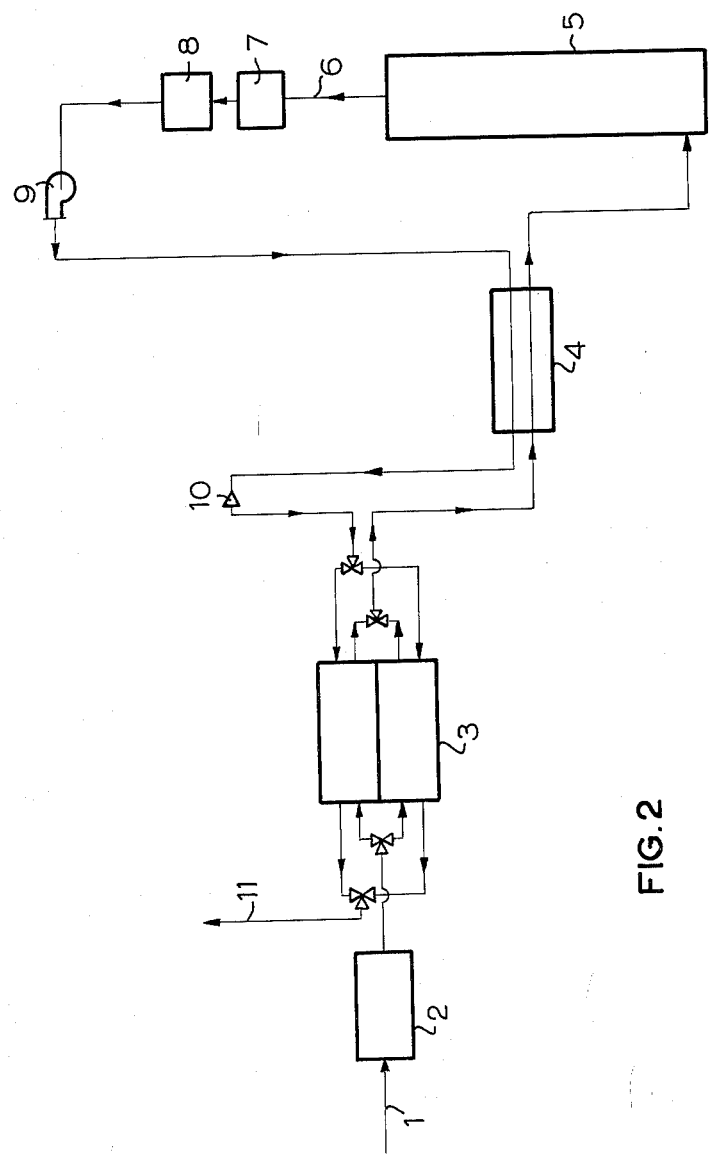

Figure 1 is a graphic representation of the saturation vapor pressure of nitrogen in hydrogen at various temperatures on the Kelvin scale; and Figure 2 is a simple flow diagram illustrating the present process.

It has been found that the prior theoretical proposal is not the case. For nitrogen, for example, the saturation vapour pressure in the hydrogen in general shows a considerable increase with the hydrogen pressure at temperatures lower than 63° K. This phenomenon is so marked that below a certain temperature, which is dependent on the pressures to be compared, the maximum concentration of the nitrogen in the hydrogen is higher at higher pressures of the hydrogen than it is at lower pressures. By way of explanation, some figures will be given. At 35° K. hydrogen under 10 ats. pressure has the same maximum concentration of nitrogen as hydrogen at a pressure of 1.3 ats. at this temperature. On the lowering the temperature to 30° K., the maximum concentration at 10 ats. increases to about 10 times the maximum concentration at 1.3 ats. at that temperature. At 42½° K. hydrogen at 25 ats. has the same maximum concentration of nitrogen as hydrogen at 1.3 ats. At 30° K. the maximum concentration at 25 ats. is already 1000 times as high as at 1.3 ats. At 51° K. hydrogen at 50 ats. has the same maximum concentration of nitrogen as hydrogen at 1.3 ats. At 40° K. the maximum concentration at 50 ats. is 10 to 20 times, and at 30° K. over 4000 times as high as at 1.3 ats. The data of this paragraph is summarized in Figure 1 wherein changes in temperature are measured along the X axis and changes in nitrogen pressure are measured along the Y axis.

From this it is apparent that the expanded hydrogen is not capable of taking up as much nitrogen as that deposited by the hydrogen which is to be purified even if the expanded hydrogen has as high a temperature at any given point in the regenerator or heat exchanger as the hydrogen to be purified when at that point.

According to the present invention, the foregoing phenomenon is utilised to advantage. Technical hydrogen is purified by subjecting the hydrogen to a preliminary cooling to a temperature below the condensation temperature of the contaminating gases to be removed (such as nitrogen, carbon monoxide, argon), so that the greater part of these contaminating substances are deposited in the liquid form. The residual impurities are then removed by passing the partly purified hydrogen through a heat regenerator or reversing heat exchanger so that the partly purified hydrogen is cooled and the residual impurities are deposited in said apparatus in the solid form. The deposited solid is subsequently removed by traversing the apparatus in the opposite direction with a flushing current of an equal amount of colder purified hydrogen. The flushing hydrogen is passed through the regenerator or exchanger under a pressure higher than that of the partly purified hydrogen current which passed through the said apparatus. The preliminary cooling is carried out at a sufficiently low temperature to ensure that at the respective pressures of the partly purified and the flushing gas currents through the said apparatus, the maximum possible concentration of the impurities in the flushing gas is higher at any point in the apparatus than the maximum concentration of the impurities at that point in the partly purified gas.

The temperature to which the hydrogen is preliminarily cooled will be lower than the temperature at which the maximum concentrations of the impurities in hydrogen at the operative pressures obtaining during deposition and flushing respectively are equal. The extent to which the previously mentioned preliminary cooling temperature will be lower, is determined by the amount necessary to compensate for the effect of the lower temperature of the flushing gas current.

The hydrogen to be used for cleaning the chambers is preferably obtained by cooling purified high-pressure hydrogen and then expanding the hydrogen to the desired final pressure.

In the distillation of hydrogen this high-pressure hydrogen is preferably obtained by heating the pure low-pressure hydrogen coming from the distilling plant in heat exchangers, next compressing it to a high pressure and, after cooling in counter-current relation to the low-pressure hydrogen, expanding it to the pressure desired for the flushing gas. In this process cold is obtained. The cold obtained on expansion can be advantageously utilized to compensate for the deficiency in cold created in the low-temperature part of the apparatus.

The minimum temperature to which the hydrogen can be cooled by applying the process is dependent on the pressures applied. It is impossible to continue the cooling beyond the point where the hydrogen becomes liquid at the pressure applied. In order to avoid difficulties with the colder flushing gas its pressure is preferably kept sufficiently above the critical pressure of the hydrogen. Preferably the pressure will be over 15 atmospheres.

Preferably, the pressure of the hydrogen to be purified will be kept low, e.g. below 2 atmospheres, in order that cooling may be continued as far as possible without hindrance due to the condensation of hydrogen. If the cooled hydrogen is to be distilled it is preferably expanded to the pressure at which the distillation is effected, e.g. 1.3 atmospheres.

According to the invention, the final remaining traces of impurities, which might cause difficulties in the distillation of the hydrogen at low pressure, e.g. 1.3 atmospheres, may subsequent to the purification be removed by means of a small filter. At the very low temperature involved the filter will have a very great capacity. This process is illustrated diagrammatically in Figure 2 wherein technical hydrogen is introduced through line 1 to cooler 2. The technical hydrogen then goes to reversing heat exchanger 3 through an appropriate control valve. After leaving the reversing heat exchanger 3, the hydrogen goes through an appropriate control valve to heat exchanger 4 and then goes to distillation column 5. Pure, low pressure hydrogen emerges through line 6 and goes to heat exchangers 7 and 8. From heat exchanger 8 the hydrogen goes by an appropriate line to compressor 9 and thence as a flushing gas to heat exchanger 4 in countercurrent flow to the impure hydrogen. Following this the hydrogen goes to expansion valve 10 and in countercurrent flow to the incoming technical hydrogen through reversing heat exchanger 3 and out through line 11.

Although in the foregoing we have more specifically referred to the removal of nitrogen as an impurity it is to be understood that other impurities such as carbon monoxide and argon may likewise be removed. Usually all these gaseous impurities will occur together so that they will be removed simultaneously.

I claim:

1. In a process for the purification of technical hydrogen comprising subjecting the hydrogen to a preliminary cooling to a temperature below the condensation temperature of the contaminating gases to be removed, said contaminating gases being selected from the group consisting of nitrogen, carbon monoxide and argon so that the greater part of these contaminating substances are deposited in the liquid form, then removing the residual impurities by passing the partly purified hydrogen through a heat exchanging means so that the partly purified hydrogen is cooled and the residual impurities are deposited in said apparatus in the solid form, and removing the deposited solid subsequently by traversing the apparatus in the opposite direction with a flushing current of an equal amount of colder purified hydrogen the improvement comprising passing the flushing hydrogen through the heat exchanging means under a pressure higher than that of the partly purified hydrogen current which passed through the said apparatus, the preliminary cooling being carried out at a temperature below 63° K. to ensure that at the respective pressures and temperatures of the partly purified and the flushing gas currents through the said apparatus, the maximum possible concentration of the impurities in the flushing gas is higher at any point in the apparatus than the maximum concentration of the impurities at that point in the partly purified gas.

2. Process according to claim 1, wherein the flushing hydrogen is obtained by expanding cooled and purified high-pressure hydrogen to the pressure desired.

3. Process according to claim 1, wherein the pressure of the flushing hydrogen current is kept above the pressure at which the hydrogen becomes liquid at the temperature of the flushing hydrogen.

4. A process according to claim 1 wherein the contaminating gases comprise nitrogen.

References Cited in the file of this patent

UNITED STATES PATENTS

| | | |
|---|---|---|
| 2,062,537 | Twomey | Dec. 1, 1936 |
| 2,113,680 | De Baufre | Apr. 12, 1938 |
| 2,632,316 | Eastman | Mar. 24, 1953 |

OTHER REFERENCES

Chemical Engineering Progress, volume 50, pages 227 and 228.